UNITED STATES PATENT OFFICE.

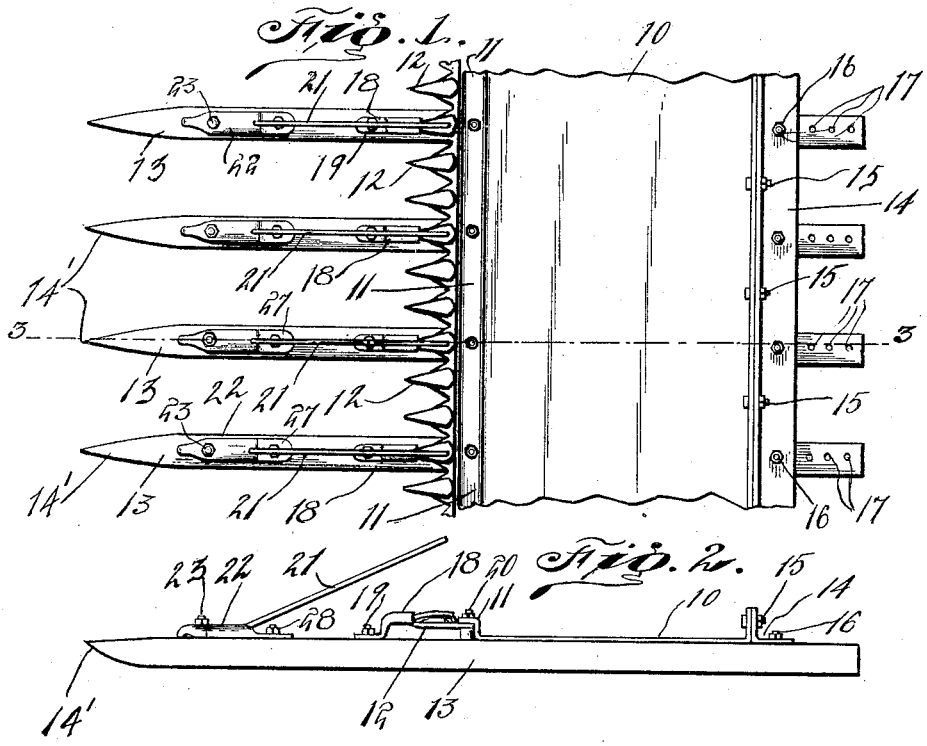

LOUIS S. LINN, OF FAIRMONT, MINNESOTA.

HARVESTER ATTACHMENT.

1,105,084.  Specification of Letters Patent.  Patented July 28, 1914.

Application filed December 29, 1913. Serial No. 809,336.

*To all whom it may concern:*

Be it known that I, LOUIS S. LINN, a citizen of the United States, residing at Fairmont, in the county of Martin, State of Minnesota, have invented certain new and useful Improvements in Harvester Attachments; and I do hereby declare the following to be a full, clear, and exact description of the invention, such as will enable others skilled in the art to which it appertains to make and use the same.

This invention relates to harvester attachments and has for an object to provide a novel device for lifting fallen grain in advance of the cutting apparatus, the attachment being adapted to be readily applied to the various harvesters now in general use without alteration to the same.

A further object of the invention is to provide novel means for preventing trash from accumulating upon the fingers of the harvester finger bar to which the dividing bars of my invention are secured, and to further provide novel means for preventing trash accumulating at the junctures of the spring lifting rods with the dividing bars.

With the above objects in view the invention consists of certain novel details of construction and combination of parts hereinafter fully described and claimed, it being understood that various modifications may be made in the minor details of construction within the scope of the appended claims.

In the accompanying drawing forming part of this specification:—Figure 1 is a plan view of a harvester platform showing the application of my invention. Fig. 2 is a side elevation of the parts shown in Fig. 1. Fig. 3 is a longitudinal sectional view taken on the line 3—3 Fig. 1. Fig. 4 is a detail perspective view of one of the dividing bars and attached lifting rod. Fig. 5 is a detail perspective view of the lifting rod shield. Fig. 6 is a detail perspective view of the finger shield.

Referring now to the drawing in which like characters of reference designate similar parts, 10 designates a harvester platform, and 11 the finger bar thereof which carries guard fingers 12, these parts being all of the usual and well known construction.

The attachment forming the subject-matter of this invention comprises a plurality of straight tubular dividing bars 13 which are disposed in parallel relation on the bottom face of the platform 10 and are adapted to extend forwardly and rearwardly therebeyond. An angle iron attaching bar 14 connects all the dividing bars near the rear ends of the latter, a plurality of bolts 15 or similar connectors being passed through the upper leg of this attaching bar and through the rear sill of the platform to secure the rear ends of the dividing bars to the platform. A bolt 16 or similar connector is passed through the horizontal leg of the attaching bar and through any particular one of a series of openings 17 of each dividing bar to adjustably secure the dividing bars to the attaching bar.

Each dividing bar is equipped on the top face with a shield 18 of the general shape shown in Fig. 6, this shield being preferably formed of a single blank of sheet metal of U-shaped cross section and formed with an offset intermediate the ends to dispose the ends out of alinement, the front end of the shield being bolted or otherwise secured to the related dividing bar, as shown at 19, and the rear end of the shield being adapted to house the point of that particular finger, which overlies the dividing bar. A bolt 20 is passed through said finger and through said dividing bar. The shield 18 and bolt 20 of each dividing bar coöperate in securing the dividing bar to the front end of the platform, the shield having the additional function of forming a guard which prevents trash and the like accumulating underneath the related finger.

Each dividing bar 13 is pointed at the front end as shown at 14', and is provided on the top face in rear of this point with an upwardly and rearwardly inclining grain lifting rod 21, a shield 22 of the general shape shown in Fig. 5 housing the connection of the lifting rod with the dividing bar, and a bolt 23 or similar connector being passed through the shield and through the rod and bar to fixedly secure the parts together.

The shield 22 is preferably formed from a single blank of sheet metal of U-shape cross section, the web 24 being provided at the front end with a downwardly extending hook 25 which is adapted to engage in an opening 26 formed in the dividing bar, and being further provided at the rear end with a downturned extension 27 through which and said dividing bar a bolt 28 is passed, The web is furthermore provided with alined spaced openings 29 and 30, the foremost of which receives the securing bolt 23 of the lifting rod, and the rearmost of which receives the lifting rod itself and holds said rod extending longitudinally along the dividing bar. The shield 22 and securing bolt 23 of each lifting rod coöperate in rigidly securing the rod to the related dividing bar, the shield having the additional function of preventing trash accumulating at the juncture of the rod and bar.

It will be seen that when the constituent parts of my device are assembled as above described and illustrated, the dividing bars extend a considerable distance in front of the platform while the lifting rods rise considerably above the front end of the platform. In operation the dividing bars and lifting bars serve to straighten tangled fallen grain and to lift up the same and support the grain in an erect position while being cut by the cutting apparatus.

What is claimed, is:—

1. A device for lifting fallen grain including parallel dividing bars, upwardly and rearwardly inclined lifting rods carried by the dividing bars, combined shields and securing means connecting the lifting rods to the dividing bars, the said securing means including each a member provided with a hook engaging a perforation in a dividing bar and spaced openings, one of the said spaced openings housing a portion of a lifting rod, and the other a securing bolt passing through an eye in the extremity of a lifting rod and perforations in the dividing bar.

2. A device for lifting fallen grain including a plurality of parallel dividing bars, a plurality of upwardly and rearwardly inclined lifting rods carried respectively by corresponding dividing bars, and a combined shield and securing means for connecting each lifting rod to the related dividing bar including an inverted U-shape member having spaced openings in the web, one of said openings receiving said lifting rod, a securing pin passed through the other of said openings and through the lower end of said rod and through said dividing bar, said web being provided on the front end with a down-turned hook, said hook engaging in a corresponding opening formed in said dividing bar.

In testimony whereof, I affix my signature, in the presence of two witnesses.

LOUIS S. LINN.

Witnesses:
J. E. PALMER,
SARAH A. DECKER.

Copies of this patent may be obtained for five cents each, by addressing the "Commissioner of Patents, Washington, D. C."